United States Patent [19]

Jacquemin et al.

[11] Patent Number: 4,866,127
[45] Date of Patent: Sep. 12, 1989

[54] ELASTOMERIC POLYETHERAMIDE/NITRILE RUBBER COMPOSITIONS

[75] Inventors: Jean-Pierre Jacquemin, Bernay; Gerard Deleens, Beaumesnil, both of France

[73] Assignee: Atochem, Puteaux, France

[21] Appl. No.: 935,183

[22] Filed: Nov. 26, 1986

[30] Foreign Application Priority Data

Nov. 26, 1985 [FR] France ............................... 85 17474

[51] Int. Cl.⁴ ...................... C08L 77/00; C08L 67/00
[52] U.S. Cl. ........................................ 525/90; 525/91; 525/167; 525/183; 525/184
[58] Field of Search ................... 525/183, 184, 90, 91, 525/92, 167

[56] References Cited

U.S. PATENT DOCUMENTS 4,383,083  5/1983  Nielinger et al. .
4,716,198 12/1987  Murobayashi ...................... 525/167

FOREIGN PATENT DOCUMENTS 0023435  2/1985  Japan ................................... 525/183
60-81590  5/1985  Japan .
0170646  9/1985  Japan ................................... 525/183
1559041  3/1976  United Kingdom .

Primary Examiner—Wilbert J. Briggs, Sr.
Assistant Examiner—A. Carrillo
Attorney, Agent, or Firm—Burns, Doane, Swecker & Mathis

[57] ABSTRACT

Improved thermoplastic elastomeric compositions adopted for easy conversion, e.g., by injection molding or extrusion techniques, into useful shaped articles having good abrasion and tear resistance, and marked resistance to oils and fats, include a polyetheramide, advantageously a polyetheresteramide, and a nitrile rubber, e.g., a copolymer of 1,3-butadiene or isoprene with (meth)acrylonitrile.

12 Claims, 1 Drawing Sheet

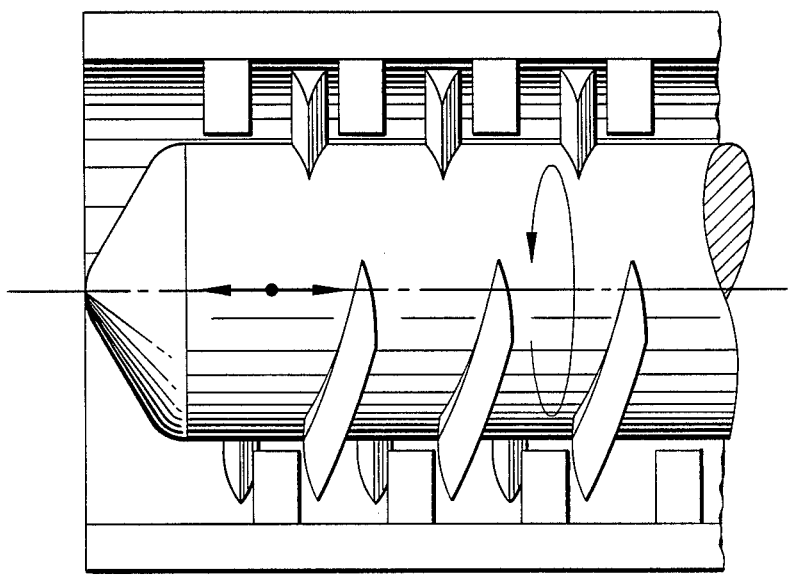

ELASTOMERIC POLYETHERAMIDE/NITRILE RUBBER COMPOSITIONS

SUMMARY OF THE INVENTION

The present invention relates to novel thermoplastic elastomeric compositions of matter, and, more especially, to such novel compositions comprised of a copolyetheramide and a nitrile rubber.

Briefly, the present invention features the unexpected discovery that the polyetheramides and nitrile rubbers are essentially completely miscible in the molten state, in all proportions, and upon cooling yield perfectly homogeneous compositions without the segregation or separation of one or the other component.

The subject compositions have desirable and interesting physical and chemical properties which are far superior to those that would be expected from simple admixtures.

The novel compositions of this invention are comprised of from 0.1 to 99.9% by weight of polyetheramide and from 99.9 to 0.1% by weight of the nitrile rubber.

As these compositions are thermoplastic, they are easily and readily converted into molded shaped articles, e.g., by injection, extrusion or compression molding methods into tubes, films, cable coatings, etc.

It is also possible to reduce them to a powdery state by cryogenic grinding, said powders then being used to coat metals by electrostatic projection or fluidized immersion coating.

In addition to the two principal components, the polyetheramide and nitrile rubber, the compositions of the invention may also contain the typical additives and adjuvants, e.g., colorants, organic or inorganic fillers, heat and light stabilizers, plasticizers, and the like.

BRIEF DESCRIPTION OF THE DRAWING

The FIGURE of Drawing is a schematic view, partially in cross-section, of mixing apparatus suitable for formulating the novel compositions of the invention.

DETAILED DESCRIPTION OF THE PREFERRED EMBODIMENTS OF THE INVENTION

More particularly according to the present invention, by the term "polyetheramide" are intended the statistical polyetheramides (namely, those having random chain lengths of their different monomeric constituents) comprising recurring polyetheramide sequences constituted by block segments of varying chain lengths of the different constituents thereof, e.g., polyamide blocks and polyether blocks.

Sequential polyetheramides result from the copolycondensation of polyamide sequences having reactive end groups, with polyether sequences having reactive end groups, such as, for example:

(1) Polyamide sequences having terminal amino groups at each end of the polymer chain with polyoxyalkylene sequences having terminal carboxylic acid groups at each end of the polyether chain;

(2) Polyamide sequences having terminal carboxylic acid groups at each end of the polyamide chain with polyoxyalkylene sequences having terminal amino groups at each end of the polyether chain, prepared by cyanoethylation and hydrogenation of polyetherdiols; and (3) Polyamide sequences having terminal carboxylic acid groups at each end of the polyamide chain with aliphatic alpha, omega-dihydroxyl polyoxyalkylenes, designated polyetherdiols, the resultant polyetheramides being polyetheresteramides.

The composition and preparation of such polyetheresteramides is described in French Patents Nos. 74.18913 and 77.26678, and in U.S. Pat. Nos. 4,331,786 and 4,332,920, assigned to the assignee hereof and incorporated herein by reference Representative such polyetheresteramides are comprised of from about 85 to 15% by weight of carboxylated polyamide blocks having a molecular weight of from about 600 to 5000 and from about 15 to 85% by weight of hydroxylated polyether blocks having a molecular weight of from about 200 to 3000. Exemplary polyamides are nylon 6, nylon 11 and nylon 12, and a representative polyetherdiol is polyoxytetramethylene glycol.

By "nitrile rubber" is intended an elastomeric copolymer resulting from the copolymerization of 1,3-butadiene or isoprene with a vinyl nitrile monomer, such as acrylonitrile or methacrylonitrile, or mixture thereof.

The compositions according to the invention are prepared by intermixing the two components in the molten state and cooling the admixture which results. For example, suitable mixer may be charged with a prepared mixture, at an ordinary temperature, of polyetheramide and nitrile rubber, or it may be continuously supplied with each of the two components.

Good mixing is indispensable, but excessively vigorous mixing is harmful, if a nitrile rubber with a strong cross-linking tendency is used, as vigorous mixing and increasing temperatures accelerate cross-linking, which results in an excess of highly viscous, heterogeneous product.

Good results are obtained by using a mixer which has a shear rate of about 2000 sec$^{-1}$ at the selected temperature.

In order to further illustrate the present invention and the advantages thereof, the following specific examples are given, it being understood that same are intended only as illustrative and in nowise limitative.

In said examples to follow, the mixer used was a "Co-Mixer" of type PR 46, marked by the Swiss Company, BUSS AG.

This apparatus is characterized in that it has a single screw with a discontinuous thread, with each turn of the thread being interrupted by three notches, and the remaining parts of the thread constituting the mixing blades (see the FIGURE of Drawing).

Furthermore, simultaneously with one complete rotation, the screw undergoes an axial reciprocating motion.

This co-mixer, which provides the shearing rate specified above, is continuously supplied by means of two helical screw metering feeders, with polyetheramide granules on the one hand, and a nitrile rubber powder on the other.

Being equipped at its distal end with a multiple hole die, the mixer produces a plurality of liquid streams which are solidified and cooled by immersion in a water tank, prior to being conveyed to a granulator.

The granules obtained were used, after suitable drying to mold the specimens required for the different tests that were carried out, to determine certain properties of the resultant compositions.

In this manner, the following were measured:
(i) Shore D hardness according to ASTM D 1484;

(ii) Density according to ASTM D 792;

(iii) Tensile stress expressed in MPa and elongation at rupture in percent, according to ASTM D 638;

(iv) Bending deflection in mm, bending stress in MPa and bending modulus in MPa in bending tests according to ASTM D 790;

(v) Resistance to abrasion, measured by the loss expressed in $mm^3$ on $100 \times 100 \times 2$ mm test plates, according to DIN 53516 (distance of 40 m, 1 kg load, rotating specimen holder);

(vi) Tear resistance, expressed in $KNm^{-1}$, according to the ISO 34 standard;

(vii) Resistance to oils and fats according to ASTM D 543, by measuring the variation in weight of specimens immersed for 3 to 7 days in ASTM oil No. 3 and fat 4746 at 100° C.

The molecular weight of the polyetheramide used was determined by measuring the inherent viscosity of its solution in meta-cresol (0.5 g per 100 g) at a temperature of 25° C. and expressed in $dl.g^{-1}$.

The following component materials were used:

POLYETHERAMIDE

Two polyetheresteramides (PEBA) were used:

PEBA 1: Prepared by polycondensation according to French patent No. 74.18913, of 67 parts by weight of a prepolymer of dicarboxylic polyamide-12 (obtained from lauryllactam and adipic acid) having a molecular weight of 2000, with 33 parts by weight of polyoxytetramethylene glycol having a molecular weight of 1000 (this polyetheresteramide block copolymer had an inherent viscosity of 1.67 $dl.g^{-1}$);

PEBA 2: Prepared by the polycondensation, as above, of 30 parts by weight of a prepolymer of dicarboxylic polyamide-12 (from lauryllactam and adipic acid), having a molecular weight of 850, with 70 parts by weight of polyoxytetramethylene glycol, molecular weight 2000, this block polyetheresteramide having an inherent viscosity of 1.84 $dl.g^{-1}$.

NITRILE RUBBER

Two different rubbers were used: CHEMIGUM N 8 B - 1 A 2 (abbreviated CH N 8) and N 612 B (CH N 612), marketed by GOODYEAR CO.

Both were copolymers of butadiene and 33% acrylonitrile and were in the form of powders, 98% of the particles of which having a size of less than 1 mm.

In addition to the two fundamental components, NAUGARD 445, 4,4′-bis(2,2-dimethylbenzyldiphenylamine) marketed by UNIROYAL was used as a heat stabilizer.

EXAMPLE 1

The co-mixer was continuously supplied, on the one hand, with the polyetheramide PEBA 1, and on the other, with a prepared mixture of 30 parts by weight of nitrile rubber CH N 8 and 2.5 parts by weight of NAUGARD, such that the following amounts were charged into the co-mixer:

(i) 70 parts by weight of PEBA 1;
(ii) 30 parts by weight CH N 8;
(iii) 2.5 parts by weight NAUGARD.

The temperatures prevailing in the co-mixer were the following, from the inlet to the outlet:

| 160° C. | 165° C. | 195° C. | 200° C. | 175° C. |
| --- | --- | --- | --- | --- |

EXAMPLES 2, 3 and 4

In same manner and using the same extrusion temperatures, three other compositions were prepared, as indicated in the following Tables 1, 2, 3 and 4.

The properties of these compositions, measured on injection molded specimens prepared from the granules obtained in the examples, are reported in said Tables 1, 2, 3 and 4.

As a comparison, the properties of the pure polyetheresteramides are also reported in these tables.

It was found that by varying the nature and the proportions of the two components, compositions having widely different properties may be prepared.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermoplastic, elastomeric composition of matter, consisting essentially of from 0.1 to 99.9% by weight of a polyetheramide and 99.9 to 0.1% by weight of a nitrile rubber.

2. The composition of matter as defined by claim 1, said polyetheramide comprising a polyetheresteramide block copolymer.

3. The composition of matter as defined by claim 1, said nitrile rubber comprising a copolymer of 1,3-butadiene or isoprene with (meth)acrylonitrile.

4. The composition of matter as defined by claim 1, said polyetheramide comprising the copolycondensation block polymerizate of a polyamide having amino end groups with a polyoxyalkylene polyether having carboxylic acid end groups.

5. The composition of matter as defined by claim 1, said polyetheramide comprising the copolycondensation block polymerizate of a polyamide having carboxylic acid end groups with a polyoxyalkylene polyether having amino end groups.

6. The composition of matter as defined by claim 2, said polyetheresteramide block copolymer comprising the copolycondensation polymerizate of a polyamide having carboxylic acid end groups with a polyoxyalkylene polyether having hydroxyl end groups.

7. The composition of matter as defined by claim 6, said terminally carboxylated polyamide having a molecular weight of from about 600 to 5000 and said terminally hydroxylated polyoxyalkylene polyether having a molecular weight of from about 200 to 3000.

8. The composition of matter as defined by claim 7, said polyetheresteramide block copolymer comprising from about 85 to 15% by weight of the polyamide and from about 15 to 85% by weight of the polyether.

9. The composition of matter as defined by claim 8, said polyamide comprising nylon 6, nylon 11 or nylon 12.

10. The composition of matter as defined by claim 9, said polyamide comprising nylon 12, said polyether comprising polyoxytetramethylene glycol, and said nitrile rubber comprising a copolymer of 1,3-butadiene and acrylonitrile.

11. A homogeneous melt of the composition of matter as defined by claim 1.

12. A molded shaped article comprising the composition of matter as defined by claim 1.

* * * * *

UNITED STATES PATENT AND TRADEMARK OFFICE
CERTIFICATE OF CORRECTION

PATENT NO. : 4,866,127

DATED : Sept. 12, 1989

INVENTOR(S) : Jean-Pierre Jacquemin

It is certified that error appears in the above-identified patent and that said Letters Patent is hereby corrected as shown below:

In column 4, between lines 14 and 15, insert Tables 1-4 as shown on the attached sheets.

Signed and Sealed this

Thirteenth Day of August, 1991

Attest:

HARRY F. MANBECK, JR.

Attesting Officer

Commissioner of Patents and Trademarks

Patent No. 4,886,127

TABLE 1

| | COMPOSITIONS, PARTS BY WEIGHT | | | | | PHYSICAL PROPERTIES | | | |
| --- | --- | --- | --- | --- | --- | --- | --- | --- | --- |
| | Polyetheramide | | Nitrile rubber | | Naugard 445 | SHORE hardness | DENSITY | TENSILE | |
| | Nature | Parts by Weight | Nature | Parts by Weight | Parts by Weight | | | Stress MPa | Elongation % |
| Control | PEBA 1 | 100 | | 0 | 0 | 55 (d) | 1.01 | 33 | 510 |
| Example 1 | PEBA 1 | 70 | CH N 8 | 30 | 2.5 | 41 (d) | 1.028 | 26 | 200 |
| Example 2 | PEBA 1 | 60 | CH N 8 | 40 | 2.5 | 38 (d) | 1.012 | 26.3 | 250 |
| Control | PEBA 2 | 100 | | 0 | 0 | 83 (a) | 1.01 | 29 | 650 |
| Example 3 | PEBA 2 | 70 | CH N 6 12 | 30 | 2.5 | 77 (a) | 1.033 | 10.8 | 323 |
| Example 4 | PEBA 2 | 60 | CH N 6 12 | 40 | 2.5 | 74 (a) | 1.034 | 8.2 | 280 |

(d) = SHORE hardness D (a) = SHORE hardness A

TABLE 2

| | COMPOSITIONS, PARTS BY WEIGHT ||||| PHYSICAL PROPERTIES ||||
| | Polyetheramide || Nitrile rubber || Naugard 445 | DEFLEC-TION mm | BENDING Stress MPa | MODULUS MPa | ABRASION mm³ |
| | Nature | Parts by Weight | Nature | Parts by Weight | Parts by Weight | | | | |
| Control | PEBA 1 | 100 | | 0 | 0 | 24 | 10 | 200 | |
| Example 1 | PEBA 1 | 70 | CH N 8 | 30 | 2.5 | 26 | 4.5 | 80 | 76 |
| Example 2 | PEBA 1 | 60 | CH N 8 | 40 | 2.5 | 24.5 | 3.8 | 66 | 110 |
| Control | PEBA 2 | 100 | | 0 | 0 | 31 | 2 | 29.5 | |
| Example 3 | PEBA 2 | 70 | CH N 6 12 | 30 | 2.5 | 27.7 | 1.2 | 14 | 203 |
| Example 4 | PEBA 2 | 60 | CH N 6 12 | 40 | 2.5 | 29.1 | 1.0 | 11.7 | 253 |

TABLE 3

| | COMPOSITIONS, PARTS BY WEIGHT | | | | | TEAR STRENGTH KNm$^{-1}$ | |
|---|---|---|---|---|---|---|---|
| | Polyetheramide | | Nitrile rubber | | Naugard 445 | unnotched | notched |
| | Nature | Parts by Weight | Nature | Parts by Weight | Parts by Weight | | |
| Control | PEBA 1 | 100 | | 0 | 0 | | |
| Example 1 | PEBA 1 | 70 | CH N 8 | 30 | 2.5 | 85 | 85 |
| Example 2 | PEBA 1 | 60 | CH N 8 | 40 | 2.5 | 79 | 59 |
| Control | PEBA 2 | 100 | | 0 | 0 | 75 | 49 |
| Example 3 | PEBA 2 | 70 | CH N 6 12 | 30 | 2.5 | 55 | 32 |
| Example 4 | PEBA 2 | 60 | CH N 6 12 | 40 | 2.5 | 50 | 35 |

TABLE 4

| | COMPOSITIONS, PARTS BY WEIGHT | | | | | RESISTANCE TO OILS AND FATS, 100°C | | | |
| --- | --- | --- | --- | --- | --- | --- | --- | --- | --- |
| | Polyetheramide | | Nitrile rubber | | Naugard 445 | ASTM oil 3 % | | 4647 fat % | |
| | Nature | Parts by Weight | Nature | Parts by Weight | Parts by Weight | 3 days | 7 days | 3 days | 7 days |
| Control | PEBA 1 | 100 | | 0 | 0 | +16.5 | | +5.4 | |
| Example 1 | PEBA 1 | 70 | CH N 8 | 30 | 2.5 | +13.5 | +14 | +4.5 | +6.0 |
| Example 2 | PEBA 1 | 60 | CH N 8 | 40 | 2.5 | +16 | +17.5 | +7.1 | +6.2 |
| Control | PEBA 2 | 100 | | 0 | 0 | +91 | +79 | +19.4 | |
| Example 3 | PEBA 2 | 70 | CH N 6 12 | 30 | 2.5 | +57 | +59 | +13.2 | +14.6 |
| Example 4 | PEBA 2 | 60 | CH N 6 12 | 40 | 2.5 | +50 | +54 | +12.1 | +14.4 |